INVENTORS.
WERNER GOLOMBEK
FRANCISCUS TIMMERMANS
BY
[signature]
AGENT

INVENTORS.
WERNER GOLOMBEK
FRANCISCUS TIMMERMANS
BY
Frank R. Trifari
AGENT

INVENTORS.
WERNER GOLOMBEK
FRANCISCUS TIMMERMANS
BY
AGENT

INVENTORS.
WERNER GOLOMBEK
FRANCISCUS TIMMERMANS
BY
Frank R. Jifari
AGENT

United States Patent Office 3,462,704
Patented Aug. 19, 1969

3,462,704

DEVICE FOR COUPLING A CONTINUOUSLY OPERATING SELF - EXCITED VELOCITY MODULATION TUBE GENERATOR TO A LOAD

Werner Golombek, Quickborn, and Franciscus Timmermans, Harksheide, Germany, assignors, by mesne assignments, to U.S. Philips Corporation, New York, N.Y., a corporation of Delaware Filed Sept. 25, 1967, Ser. No. 670,347
Claims priority, application Germany, Sept. 29, 1966, P 40,461
Int. Cl. H03b 11/08, 9/02
U.S. Cl. 331—74 12 Claims

ABSTRACT OF THE DISCLOSURE

In a high frequency heating device for high-loss materials, the efficiency of the system is increased by providing, in series, an impedance inverting network and a resonant circuit, between the high frequency generator and the load heating chamber. The resonant frequency of the resonant circuit is approximately equal to the mean frequency of the high frequency generator. In one embodiment of the invention, the impedance inverting network comprises a quarter wavelength waveguide having a characteristic impedance equal to the generator output impedance.

Figure 1:
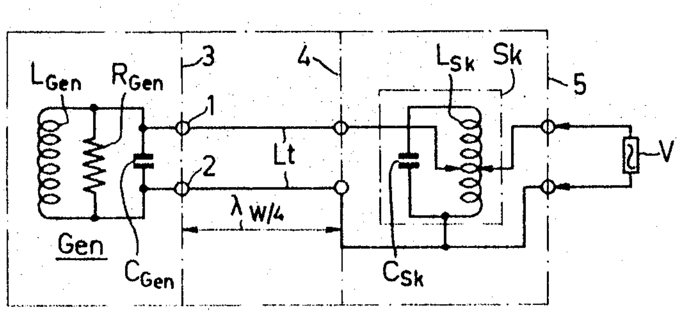

The present invention relates to a device for producing high frequency oscillations and more particularly to a high frequency device including a self-excited velocity modulation tube generator for continuous operation which is connected to a load and the operating range of which always, even with varying load, remains in a region outside the region of electronic instability.

The term "continuous operation" is to be understood to mean operation in which the generator, unlike the case of periodic pulse operation, substantially delivers a continuous-wave power, i.e. the term "continuous operation" herein includes intermittent operation with continuous-wave energy and operation with an unsmoothed operating voltage or an A.C. operating voltage.

High-frequency generators used for continuous operation in telecommunication systems, for example, as transmitters or superheterodyne converters, are generally required to exhibit such properties as constant frequency and amplitude, linear modulation characteristics and low intrinsic noise. In such uses, in order to avoid external reactions an attempt is made to obtain matching between the generator and the load or, if this cannot readily be achieved, to provide an artificial load in which a great, or even the greater, part of the generator output power is dissipated. This prevents a load which fluctuates or varies during operation from changing the operational values of the generator, for example, its frequency and output power.

Such conditions of satisfactory matching are not available in generators for continuous operation which—generally with comparatively high powers—are used for high-frequency heating of high-loss materials or for other purposes, for example, for the excitation of plasmas. The loading of the generator may vary over a wide range according to the nature, the physical properties, the mass, the dimensions and the coupling of the load. Furthermore, the properties of the material to be heated, which are some of the factors determining the load (loss angle $\delta$ and dielectric constant $\epsilon_{rel}$), may vary to a greater or lesser degree during the heating process. This is the case, for example, in thawing frozen food at the transition point from the solid to the liquid state, or in the generation of a plasma when the plasma ignites or the gas pressure changes, and the like.

In addition, in microwave heating devices, in order to render the field distribution in the material being heated more uniform, a field stirrer, a swash plate or the like is often used which generally is arranged near the energy input and greatly varies the load imposed on the generator.

The load, which varies over a large range and may change during operation, reacts on the operating values of the generator. This influence of the load on the generator can be seen from the generator diagram in which, with respect to a defined generator admittance, the relationship between the output power, the frequency and the complex reflection factor of the load connected to the generator are shown by families of curves. The complex reflection factor is a function of the complex load admittance.

The generator diagram of self-excited velocity modulation tube generators includes regions in which the generator must not be operated. These regions are the regions of electronic instability (sink region) and the thermal boundary region. In the region of electronic instability, the normal oscillation mode of the generator discontinuously changes to one or more other oscillation modes with a simultaneous change in frequency. Hence the various load conditions give rise to various unstable operating points of the generator. The result is that not only the efficiency of the generator is considerably reduced but also the generator is overloaded so that it will rapidly be destroyed. Another possibility in this region of electronic instability is a sudden cessation and an equally sudden recommencement of oscillation. This also may destroy the generator.

On the other hand, prolonged operation in the thermal boundary region may result in a shortened life or, owing to the rise in temperature due to the poor efficiency, to a gas eruption or other thermally disturbing phenomena.

All the possible reflection factors of the load must be situated in the region between the two above-mentioned regions to ensure stable operation of the generator and to avoid damage. There are cases of operation, for example, heating homogeneous uniform articles by the continuous-furnace method, in which the load can be satisfactorily matched to the generator. In most cases, however, the heating device must be designed so that without modifications articles of widely different shape and consistencies can be heated with absorption of the greatest possible part of the output power of the generator.

Many measures have been taken in order to keep the operating point within the permitted bounds in the generator diagram despite operation under such widely divergent conditions. From "VALVO-Berichte," volume VII, number 1, pages 16 and 17, when using a magnetron as the generator, it is known that the heating space, in which the load is arranged, and which frequently is a chamber enclosed by metal walls having dimensions which considerably exceed those of the load, and the coupling and tuning members which act as transformers between the generator and the heating space, should be designed so that with a "mean" load (a load having mean values) the complex load admittance appearing at the generator output corresponds to an operating point which lies at the centre of the generator diagram. Hence the operating point is about equally spaced from the two forbidden regions. However, there are no generally applicable design rules so that the optimum arrangement must be found by trial and error and at best by experimental rules. Special attention must be paid to ensure that in none of the extreme loading cases the operating point leaves the permitted region and specifically that it does not enter the region of electronic instability.

In this manner however, it is not possible to accommodate all of the possible loading cases, including no-load operation without any load other than the natural damping of the heating space. Hence, to protect the generator for all possible cases, it is common practice to make the internal losses of the heating space sufficiently large or to provide an additional load in the heating space which dissipates a certain part of the energy generated, or to couple the heating space to the generator by means of a unidirectional connection in which at least part of the energy reflected to the generator owing to mismatching is absorbed (cf. the above mentioned "VALVO-Berichte," page 30).

Further protective measures for the generator are, for example, the provision of a temperature-sensitive switch in the thermal boundary region and the production of a voltage responsive to the complex reflection factor or to the oscillation mode in the electronic boundary region.

The usual measure of the maximum deviation from ideal matching is not the reflection factor but the maximum permissible voltage standing-wave ratio $s$ at the junction with the generator. This quantity is a property of the type of generator used and depends upon its construction and manner of operation. Increasing values of the V.S.W.R. are shown in the generator diagram by circles of increasing radius about the centre of the diagram.

Although the steps described above may ensure to a certain extent that no impermissible operating point occurs, they have a limitation in that, for example, in the case where an additional load is provided, a comparatively large part of the generator output power will be dissipated in this additional load, whereas in the case where protective arrangements are provided, the generator operation may be interrupted. In addition the maximum possible output power cannot be fully utilized. This is due to the fact that, as the generator diagram shows, the output power increases because of the increase in efficiency in a direction towards the region of electronic instability, and decreases because of the decrease in efficiency in the direction towards the thermal boundary region. Therefore, with a mean load the operating point is required to be situated about midway between these two regions and especially should not approach too closely the region of electronic instability which forms a narrow more or less sector-shaped region outside that circle in the generator diagram which is determined by the maximum permissible V.S.W.R., $s_{max}$. Thus precisely the regions of large power and stable operating conditions outside the region of electronic instability cannot be utilized as operating regions if it is required that all possible operating conditions be situated within the circle of the maximum permissible V.S.W.R., $s_{max}$.

From the United States Patent 3,106,629 it is known to use coupling means between a generator and a heating space for high-loss materials. These arrangements, however, are required to transmit the energy with satisfactory distribution to the heating space. Another intermediate circuit is described in "Telefunken-Röhrenmitteilungen für die Industrie," No. 25. However, this intermediate circuit is only required to increase the frequency stability of a magnetron in the case of voltage fluctuations and external load changes.

These intermediate arrangements cannot be so used that a range of high generator power is obtainable.

The invention avoids the disadvantages and drawbacks of the prior art systems and provides means which permit a generator to be loaded at an operating point which in the case of a mean load is situated appreciably farther into the region of comparatively high generator power without load changes giving rise to the risk of the operating point entering the region of electronic instability.

According to the invention, in a device for generating high frequencies of the type described in the preamble, and in the case of comparatively high powers, in order to skip the region of electronic instability a network is connected between the velocity modulation tube generator and the heating space containing the load. This network comprises an impedance inverting network and a resonant circuit having a resonance frequency which is about equal to the mean frequency of the velocity modulation tube generator.

The term "mean frequency of the generator oscillations" is to be understood to mean the frequency which occurs when the generator is loaded by a purely resistive load.

In a further embodiment of the invention the network may be arranged so that the impedance inverting network is coupled to the velocity modulation tube generator, the resonant circuit is coupled to the inverting network and the load is coupled to the resonant circuit. This order of connection of the arrangement is advantageous when the said circuit is a parallel resonant circuit, the external Q-factor of which, multiplied by the square of a standardized ohmic load resistance in the frequency range of the generator, is greater than the external Q-factor of the generator. The external Q-factor is the reciprocal of the difference between the reciprocals of the loaded and unloaded Q-factors. Further, the impedance-inverting network may invert the complex admittance of the load and the circuit coupled to it to the coupling-out plane of the generator. The impedance-inverting network may alternatively be a wave guide having a characteristic impedance $Z_0$ equal to that by which the generator output is terminated and a length equal to $(2n-1)\lambda_W/4$, where $n$ is a positive integer and $\lambda_W$ the wave-length in the waveguide.

Furthermore, according to the invention the network may be a length of waveguide of which the first portion, which adjoins the coupling-out plane and forms the impedance inverting network, is loaded at a distance $\lambda_W/4$ from the generator through a variable coupling by the load. The next waveguide portion, which forms the resonant circuit, is short-circuited at the end remote from the generator and is tuned to $\lambda_W/4$ resonance. This latter portion is coupled to the portion forming the impedance inverting network by means of a variable coupling.

The impedance inverting network may alternatively comprise a part of length $\lambda_W/4$ of a coaxial line to the end of which remote from the generator the load is coupled and to which a part of a coaxial line, which is short-circuited at the outer end and is tuned to $\lambda_W/4$ resonance, is coupled as a resonant circuit through a variable coupling.

In another embodiment of the invention the circuit may be a series resonant circuit which is tuned at least approximately to the mean frequency of the generator and is coupled to the load, the external Q-factor of which, multiplied by the square of the reciprocal standardized load resistance, is greater than the external Q-factor of the generator. In this embodiment a special impedance inverting network can be dispensed with because the incorporation of the series resonant circuit already includes the impedance inverting network.

According to the invention the load formed by the heating apparatus may be so chosen, or so coupled to the network comprising either the combination of an impedance inverting network and a parallel resonant circuit or a series resonant circuit, that the generator operates substantially in the region of high efficiency.

The term "waveguide" is used herein to mean any kind of conductor suitable to convey high-frequency electromagnetic energy with low losses and without the occurrence of radiation. Suitable conductors are coaxial lines, waveguides of various cross-sections, and so on. The electric wavelength of the generator oscillation in the waveguide at the mean generator frequency, which may differ from the corresponding wavelength $\lambda_0$ in free space, is denoted by $\lambda_W$.

Three embodiments of the invention will now be described more fully with reference to the accompanying diagrammatic drawing, in which:

FIGURE 1 is a circuit diagram showing the basic elements of a device for generating high frequencies including an impedance inverting network and a parallel resonant circuit.

Figure 2:
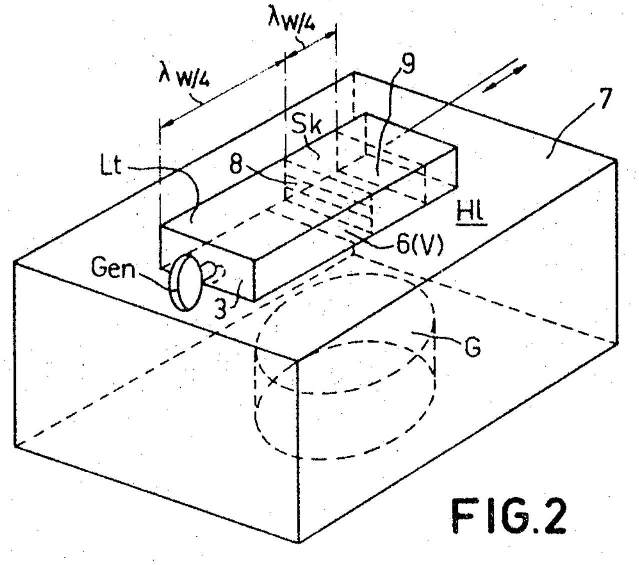
Figure 3:
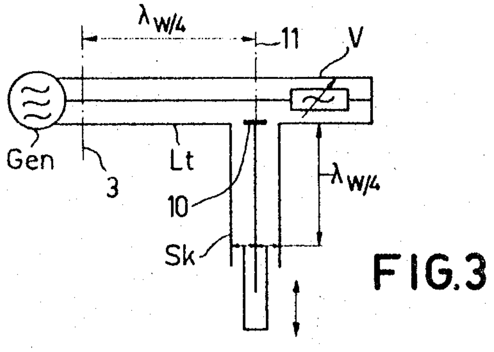
Figure 4:
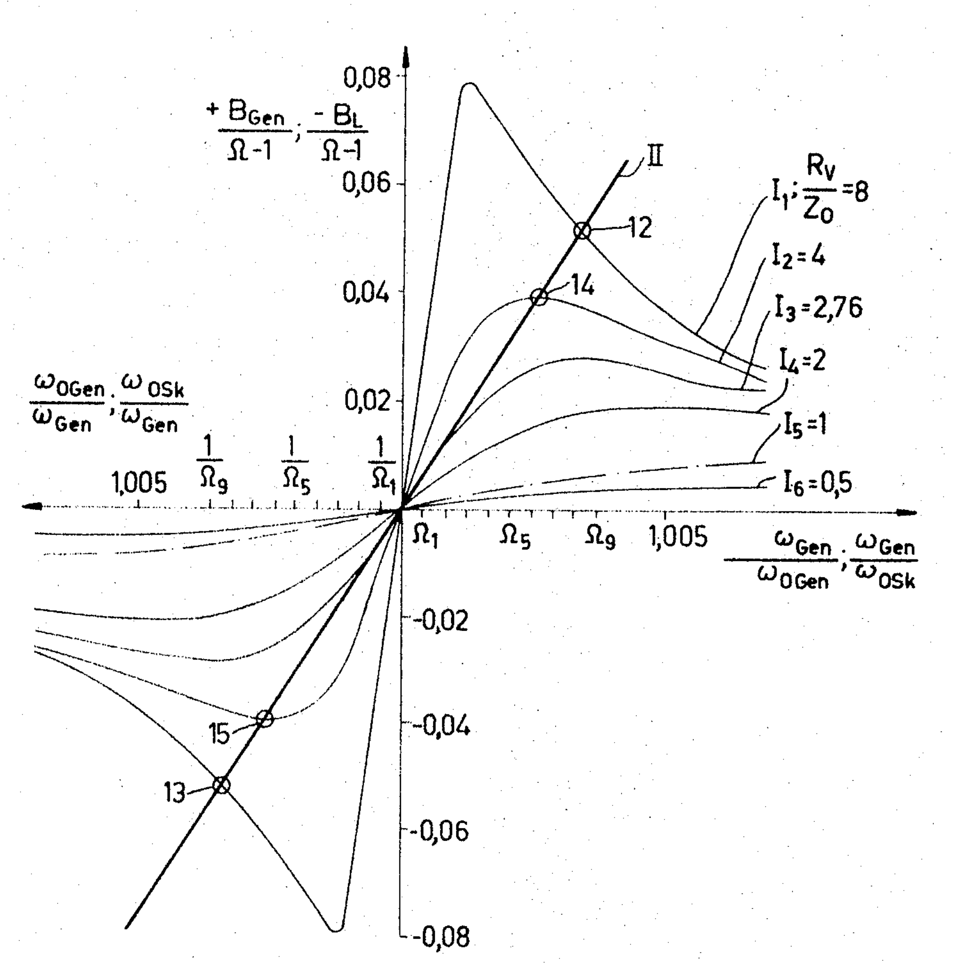
Figure 5:
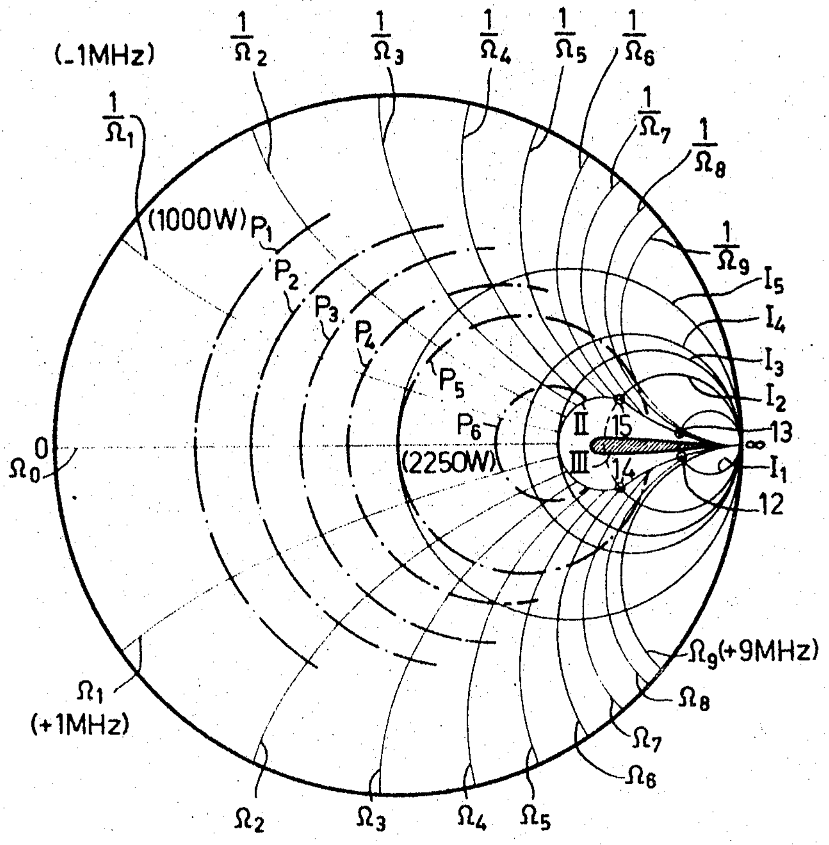
Figure 6:
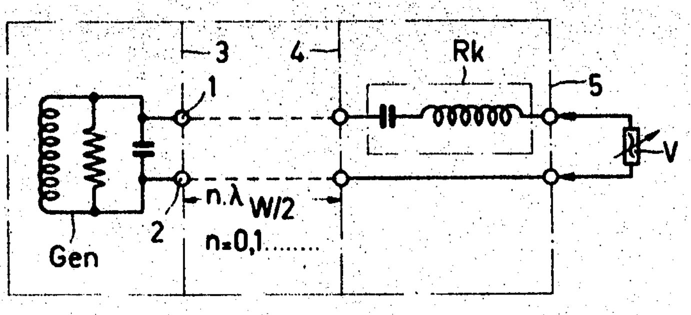
Figure 7:
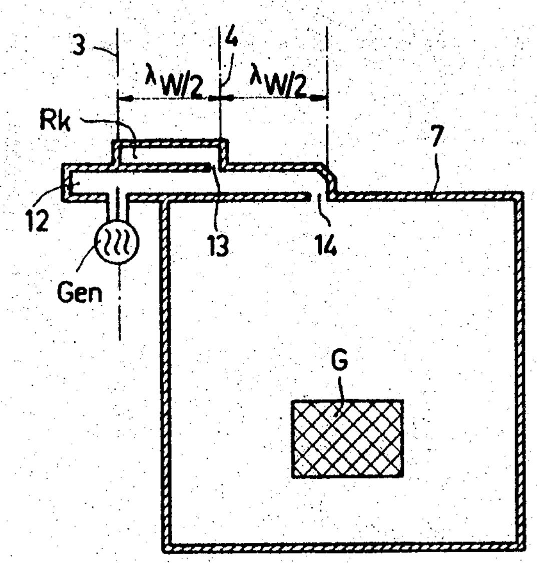

FIGURE 2 is a perspective view of an embodiment of the device for generating high frequencies as shown in FIGURE 1 and including waveguide portions, FIGURE 3 shows an embodiment of the device of FIGURE 1 including portions of coaxial lines, FIGURE 4 shows the relationship between the susceptances of the load and the generator in respect of the generator and the generator frequency as scalar quantities, FIGURE 5 shows the diagram of FIGURE 4 in the known representation as a generator diagram, FIGURE 6 shows the circuit diagram of the basic elements of a device for generating high frequencies incorporating a series resonant circuit, and FIGURE 7 shows an embodiment of the device of FIGURE 6 including a waveguide resonator of length $\lambda_W/2$.

Referring now to FIGURE 1, an impedance inverting network L*t* is connected to output terminals 1 and 2 of a generator G*en* in the coupling-out plane 3. The impedance inverting network comprises a waveguide of length $\lambda_W/4$ having a characteristic impedance $Z_0$ equal to the impedance of the generator output. In the plane 4 there is variably coupled to the other end of the network L*t* a parallel resonant circuit S*k*—shown diagrammatically by lumped circuit elements—which is loaded in a load plane 5 by a likewise variably coupled load V of complex admittance.

In the device for generating high frequencies shown in FIGURE 2, the impedance inverting network L*t* and the parallel resonant circuit S*k* are constituted by a continuous length of waveguide H*l* which, at a distance $\lambda_W/4$ from the coupling-out plane 3 of the generator G*en*, is coupled through a slot 6 of variable size and shape to a heating space 7 containing the high-frequency lossy material G to be heated. The size and physical properties of the material G, the size and shape of the heating space 7 and the size and shape of the slot 6 and of any further matching and tuning members influence the load admittance $Y_V=G_V+jB_V$ appearing at the coupling slot 6 (which corresponds to the planes 4 and 5 of FIGURE 1, which coincide in this arrangement). Thus the network L*t* is loaded in the plane 4 by the load admittance $Y_V$ appearing at the slot 6.

The parallel resonant circuit S*k* comprises a portion of the waveguide H*l* remote from the generator G*en*. Through a slot 8 of variable shape and size it is variably coupled to the load V (in the form of the slot 6 loaded by the material G) and hence to the network L*t*.

The parallel resonant circuit S*k* may be tuned to $\lambda_W/4$ resonance by a plunger 9 adapted to move in the direction of the waveguide axis. This allows any susceptance coupled in by the heating space 7 to be eliminated by tuning.

In the device shown in FIGURE 3, the network L*t* and the parallel resonant circuit S*k* of the device shown in FIGURE 2 are replaced by analogous portions of coaxial lines. The parallel resonant circuit S*k*, in the form of a branch line, is variably coupled to the impedance inverting network L*t* because the spacing of a disc 10 from the central conductor of this network is variable. The load V is shown diagrammatically as an absorption element in the coaxial line. The load has a variable complex admittance and loads the network L*t*, S*k* in a plane 11 (which corresponds to the planes 4 and 5 in FIGURE 1).

The functions of the devices shown in FIGURES 2 and 3 will now be described with reference to a computation and to the equivalent circuit of FIGURE 1 and the diagrams of FIGURES 4 and 5.

A velocity modulation tube generator G*en* is an oscillator which, near its resonant frequency, may be considered as a LRC circuit in parallel arrangement (cf. FIGURE 1: $L_{Gen}$, $R_{Gen}$ and $C_{Gen}$). This generator acts on a complex load. This results in a generator frequency $\omega_{Gen}$ such that the sum of the imaginary parts of the generator admittance and of the admittance of the load appearing at the output of the generator is equal to zero:

$$B_{Gen}+B_L=0 \qquad (1.1.)$$

$$B_{Gen}=-B_L \qquad (1.2.)$$

The generator admittance will now be considered, all quantities being transformed to the characteristic impedance $Z_0$ of the generator output.

The following symbols will be used:

$L_{Gen}$, $C_{Gen}$ the inductance and capacitance of the generator resonant circuit transformed to the generator output;

$$R_{Gen.}=\frac{-1}{G_{Gen.}}$$

the loss resistance of the generator resonant circuit transformed to the generator output;

$$Z_0=\frac{1}{Y_0}$$

the characteristic impedance by which the generator output is terminated.

For the generator admittance we have the equation $$Y_{Gen.}=G_{Gen.}+Y_0+j\left(\omega_{Gen.}C_{Gen.}-\frac{1}{\omega_{Gen.}L_{Gen.}}\right) \qquad (2.1.)$$

By substitution of the resonant angular frequency $$\omega_{0\ Gen.}=\frac{1}{\sqrt{L_{Gen.}C_{Gen.}}} \qquad (2.2.)$$

we have:

$$Y_{Gen.}=G_{Gen.}+Y_0+jC_{Gen.}\left(\omega_{Gen.}-\frac{\omega_0^2\ _{Gen.}}{\omega_{Gen.}}\right) \qquad (2.3.)$$

$$Y_{Gen.}=G_{Gen.}+Y_0+j\omega_{0\ Gen.}C_{Gen.}\left(\frac{\omega_{Gen.}}{\omega_{0\ Gen.}}-\frac{\omega_{0\ Gen.}}{\omega_{Gen.}}\right) \qquad (2.4.)$$

When, as is usual, the external Q factor is defined as:

$$Q_{E\ Gen}=\omega_{0\ Gen}C_{Gen}Z_0 \qquad (2.5.)$$

then $$Y_{Gen.}=G_{Gen.}+Y_0\left[1+jQ_{E\ Gen.}\left(\frac{\omega_{Gen.}}{\omega_{0\ Gen.}}-\frac{\omega_{0\ Gen.}}{\omega_{Gen.}}\right)\right] \qquad (2.6.)$$

Hence the imaginary part of the generator admittance is:

$$B_{Gen.}=Q_{E\ Gen.}\cdot Y_0\left(\frac{\omega_{Gen.}}{\omega_{0\ Gen.}}-\frac{\omega_{0\ Gen.}}{\omega_{Gen.}}\right) \qquad (2.7.)$$

In FIGURE 4 this imaginary part is plotted against the standardized frequency to give the curve II. When the generator is loaded by a parallel resonant circuit S*k* which not only has internal losses but also is provided with an external load V, which quantities may be taken together to give $R_v$, there is produced for the resonant circuit S*k* a curve having the same fundamental variation. When the external load is a complex admittance the resonant frequency of the circuit changes. Since for the load according to Equation 1.2. the imaginary part $-B_L$ must be plotted, this curve is a mirror image of the curve II of FIGURE 4 with respect to the abscissa (for the sake of clarity this curve is not shown in the figure). Irrespective of the position of $\omega_{0\ Gen}$ of the generator and of $\omega_{0\ Sk}$ of the resonant circuit and of the steepness of the two curves, they intersect only at one point, which represents the operating point of the generator. However, this operating point may be situated in the region of electronic instability of the generator. In the diagram of FIGURE 4, with equality of these frequencies ($\omega_{0\,\mathrm{Gen}}=\omega_{0\,\mathrm{Sk}}$) the point of intersection passes through the origin of the coordinate axes. Unequal frequencies will result in a shifting of the two curves with respect to one another along the abscissa.

If, however, as is the case in the embodiment of the invention shown in FIGURES 1 to 3, a network L*t*, in the form of a waveguide having the characteristic impedance $Z_0$ of the generator output and a length equal to $\lambda_W/4$ or an odd multiple thereof, is connected between the generator and the load, the situation is entirely changed. The network L*t* of length $\lambda_W/4$ transforms the load admittance $Y_V$ to the generator output so that the load admittance is:

$$Y_L=\frac{Y_0^2}{Y_V} \tag{3.1.}$$

or by substitution for $Y_V$:

$$Y_L=\frac{Y_0^2}{G_V+j\omega_{0\,\mathrm{Sk}}C_{\mathrm{Sk}}\left(\frac{\omega_{\mathrm{Gen}}}{\omega_{\mathrm{Sk}}}-\frac{\omega_{0\,\mathrm{Sk}}}{\omega_{\mathrm{Gen}}}\right)} \tag{3.2.}$$

or in other symbols:

$$Y_LZ_0=\frac{1}{\left[\frac{Z_0}{R_V}+jQ_{\mathrm{EV}}\left(\frac{\omega_{\mathrm{Gen}}}{\omega_{0\,\mathrm{Sk}}}-\frac{\omega_{0\,\mathrm{Sk}}}{\omega_{\mathrm{Gen}}}\right)\right]} \tag{3.3.}$$

where $$Q_{\mathrm{EV}}=\omega_{0\,\mathrm{Sk}}C_{\mathrm{Sk}}Z_0 \tag{3.4.}$$

The imaginary part $B_L$ of the load admittance $Y_L$ then is:

$$B_LZ_0=\frac{-Q_{\mathrm{EV}}\left(\frac{\omega_{\mathrm{Gen}}}{\omega_{0\,\mathrm{Sk}}}-\frac{\omega_{0\,\mathrm{Sk}}}{\omega_{\mathrm{Gen}}}\right)}{\left[\frac{Z_0^2}{R_V^2}+Q_{\mathrm{EV}}^2\left(\frac{\omega_{\mathrm{Gen}}}{\omega_{0\,\mathrm{Sk}}}-\frac{\omega_{0\,\mathrm{Sk}}}{\omega_{\mathrm{Gen}}}\right)^2\right]} \tag{3.5.}$$

and hence in principle has the shape shown by the curves $I_1$, $I_2$, . . . . as a function of the standardized frequency.

In the above the fact has been allowed for that $-B_L$ must be plotted since according to Equation 1.2. for the oscillation $\omega_{\mathrm{Gen}}$ produced the susceptance $jB_{\mathrm{Gen}}$ must be equal to $-1$ times the susceptance $B_L$, that is equal to $-B_L$. In FIGURE 4 the resonance frequency $\omega_{0\,\mathrm{Sk}}$ of parallel resonant circuit S*k* is equal to the resonance frequency $\omega_{0\,\mathrm{Gen}}$ (the mean frequency) of the generator.

The parameter of the characteristic curves $I_1$ to $I_6$ is the quotient $R_V/Z_0$, i.e. the ratio between the real part of the load resistance V and the characteristic impedance $Z_0$ of the waveguide L*t* which forms the impedance inverting network. As the ratio between these two quantities increases, both the maximum value of the reactive part and the slope of the characteristic at the point of inflection will increase, which inflection point in the case of frequency equality coincides with the origin of the coordinate axes.

The slope of the curve II in turn is dependent upon the data of the generator and is a constant for the generator concerned.

A stable operating point is available at the points of intersection of the curves I and II, where the differential quotient of the curves $I_1$ to $I_6$ of the imaginary part of the admittance is equal to, or smaller than, the differential quotient of the curve II of the imaginary part of the admittance of the generator. This is the case at points 12 and 13 of the curve $I_1$ and 14 and 15 of the curve $I_2$ but is not the case at those points of intersection of these curves which pass through the origin of the coordinate axes.

The above condition for a stable operating point is satisfied for the curves $I_3$ to $I_6$ at the point intersection of the axes.

If momentarily owing to a variation of the values of the load there should be reached on the steep branch of the relevant curve for the imaginary part of the admittance of the load, which branch passes through the origin of the coordinate axes, the point situated between the curve II for the imaginary part of the admittance of the generator and the ordinate axis, the operating point skips the middle point of intersection situated at the origin of the coordinate axes so that the stable operating point in the opposite quadrant is reached. A stable operating point in the region of electronic instability cannot be reached.

The boundary at which the operating point does not jump is shown by the curve $I_3$ the slope of which at the point of inflection is equal to the slope of the curve II. At this inflection point, which with frequency equality $$\omega_{0\,\mathrm{Gen}}=\omega_{0\,\mathrm{Sk}}$$

coincides with the point inflection of the curve II, the tangent to these two curves coincides. Thus this point is the only possible and at the same time stable point of intersection of the two curves. The curves $I_4$, $I_5$ and $I_6$, of which the parameter value $R_V/Z_0$ is smaller than that of the boundary curve $I_3$, each also have only a single stable point of intersection situated outside the region of electronic instability.

When the parallel resonant circuit S*k* is loaded by a complex load or the resonant circuit is not exactly tuned to the resonance angular $\omega_{0\,\mathrm{Gen}}$ of the generator, there will be a parallel displacement of the curves, but this does not give rise to a fundamental change in behaviour.

The slope of the curve of the susceptance $B_{\mathrm{Gen}}$ is obtained by differentiation of the Equation 2.7. with respect to frequency:

$$\frac{d(B_{\mathrm{Gen}})}{d\left(\frac{\omega_{\mathrm{Gen}}}{\omega_{0\,\mathrm{Gen}}}\right)}=\frac{Q_{\mathrm{E\,Gen}}}{Z_0}\left[1+\left(\frac{\omega_{0\,\mathrm{Gen}}}{\omega_{\mathrm{Gen}}}\right)^2\right] \tag{4.1.}$$

At the point $\omega_{0\,\mathrm{Gen}}=\omega_{\mathrm{Gen}}$ the slope of this curve is:

$$\left.\frac{d(B_{\mathrm{Gen}})}{d\left(\frac{\omega_{\mathrm{Gen}}}{\omega_{0\,\mathrm{Gen}}}\right)}\right|_{\omega_{0\,\mathrm{Gen}}=\omega_{\mathrm{Gen}}}=\frac{2Q_{\mathrm{E\,Gen}}}{Z_0} \tag{4.2.}$$

The slope of the curve of the susceptance $-B_L$ of the load is obtained by differentiation of the Equation 3.5. with respect to frequency:

$$\frac{d(-B_L)}{d\left(\frac{\omega_{\mathrm{Gen}}}{\omega_{0\,\mathrm{Sk}}}\right)}=\frac{\left[\frac{Z_0^2}{R_V^2}-Q_E{}^2V\left(\frac{\omega_{\mathrm{Gen}}}{\omega_{0\,\mathrm{Sk}}}-\frac{\omega_{0\,\mathrm{Sk}}}{\omega_{\mathrm{Gen}}}\right)^2\right]Q_{\mathrm{EV}}\left[1+\frac{\omega_{0\,\mathrm{Sk}}}{\omega_{\mathrm{Gen}}}\right)^2\right]}{Z_0\left[\frac{Z_0^2}{R_V^2}+Q_E{}^2V\left(\frac{\omega_{\mathrm{Gen}}}{\omega_{0\,\mathrm{Sk}}}-\frac{\omega_{0\,\mathrm{Sk}}}{\omega_{\mathrm{Gen}}}\right)^2\right]^2} \tag{5.1.}$$

the slope at the point $\omega_{0\mathrm{Sk}}=\omega_{\mathrm{Gen}}$ then being:

$$\left.\frac{d(-B_L)}{d\left(\frac{\omega_{\mathrm{Gen}}}{\omega_{0\,\mathrm{Sk}}}\right)}\right|_{\omega_{0\,\mathrm{Sk}}=\omega_{\mathrm{Gen}}}=\frac{2Q_{\mathrm{EV}}R_V^2}{Z_0^3} \tag{5.2.}$$

Hence the condition for skipping the region of electronic instability in devices as illustrated in FIGURES 1 to 4 is:

$$\frac{2Q_{\mathrm{E\,Gen}}}{Z_0}<\frac{2Q_{\mathrm{EV}}R_V^2}{Z_0^3} \tag{6.1.}$$

$$Q_{\mathrm{E\,Gen}}<Q_{\mathrm{EV}}\left(\frac{R_V}{Z_0}\right)^2 \tag{6.2.}$$

or by substitution of the definitions of the Equations 2.5. and 3.4. with $\omega_{0\,\mathrm{Gen}}=\omega_{0\,\mathrm{Sk}}$:

$$\omega_{0\,\mathrm{Gen}}C_{\mathrm{Gen}}Z_0<\omega_{0\mathrm{Gen}}C_{\mathrm{Sk}}Z_0\left(\frac{R_V}{Z_0}\right)^2 \tag{6.3.}$$

$$C_{\mathrm{Gen}}<C_{\mathrm{Sk}}\left(\frac{R_V}{Z_0}\right)^2 \tag{6.4.}$$

In the generator diagram of FIGURE 5 the family of circles $I_1$ to $I_5$ has the same parameter values as the family of curves $I_1$ to $I_5$ in FIGURE 4. The circles are the loci for operating conditions with the same value of $R_V/Z_0$ (for the sake of clarity the circle for $R_V/Z_0=0.5$ has been omitted). The lines $\Omega_0$ to $\Omega_9$ and $1/\Omega_9$ are the loci of the points with the same frequency $\omega_{Gen}$. In FIGURE 4 they are shown with the associated values of the abscissa. Since the generator diagram is related to the the coupling-out plane 3 and shows admittances, the circles $I_1$ to $I_5$ really have the parameter $Z_0/R_L$, where $R_L$ is the load impedance appearing at the coupling-out plane 3. If, however, as is shown in FIGURE 1, the load V and the $\lambda_W/4$ network Lt are coupled to the parallel resonant circuit S*k* with the same degree of tightness, the standardized load resistance $R_V/Z_0$ is not transformed from the plane 5 to the plane 4 and $R_V/Z_0$ appears in the coupling-out plane 3, inverted through the $\lambda_W/4$ network Lt, as the load admittance $Z_0/R_L$. Consequently, upon the said condition, $R_V/Z_0$ may be equated to $Z_0/R_L$ in the diagram of FIG. 5.

The points at which the characteristic curve II of FIGURE 4 intersects the curves I are shown in FIGURE 5 as a curve II which encloses a guttiform region which is skipped by the operating point and in which the region of electronic instability III of the generator G*en* lies.

The points 12 to 15 are identical with those of FIGURE 4 and represent the stable operating points of this FIGURE.

The dot-dash characteristics $P_1$ to $P_6$ are the loci of the points of the same power. $P_1$ relates to a low, $P_6$ to a high power.

The diagram of FIGURE 5 shows that the mean operating points can be located in the region of high generator power without the risk of a stable operating point being produced in the region of electronic instability (as set forth in the preamble, such an operating condition will rapidly lead to destruction of the generator).

With respect to the coupling-out plane 3 FIGURES 1 to 5 relate to the "resistive" coupling-out plane of the generator and not to an incidental embodiment of the coupling out, which in most cases is spaced from the resistive generator coupling-out plane with an interposed length of line or waveguide for mechanical reasons. If in the technical data of a generator, as usually is the case, the generator diagram relates to the mechanical connecting plane, by a suitable interposition of a line or guide having a characteristic impedance $Z_0$ equal to that of the generator output the resistive coupling-out plane must be transformed through a distance $\lambda/2$ or an even multiple thereof. As a result the frequency curve $\Omega_0$ and hence the region of electronic instability is rotated in the generator diagram in the direction of the real axis of the diagram, resulting in the condition shown in FIGURE 5.

The numerical values of FIGURES 4 and 5 relate to a practical embodiment of the device for generating high frequencies according to the invention in which the velocity modulation tube generator is a continuous-wave magnetron having a frequency $\omega_{0Gen}$ of 2450 mc./s, a mean power of 2 kw. and a maximum permissible V.S.W.R., $s_{max}$ of 2.75 towards the region of electronic instability. This value lies at a safe distance from the region of electronic instability, which commences only at $s=3.5$. The characteristic impedance of the coaxial generator connection is 50Ω and the coupling (independent of its external influences) between the magnetron and this connection is fixed so that the external Q-factor $Q_{E\ Gen}$ is equal to 380.

As mentioned hereinbefore, the imaginary part $B_{Gen}$ of the generator admittance $Y_{Gen}$ is shown by the curve II. The curves $I_1$ to $I_6$ apply to different load resistances $R_V$. Since now in the real axis of the generator diagram in the direction in which the region of electronic instability is situated the V.S.W.R., $s$ is identical with the parameter value $R_V/Z_0$, the parallel resonant circuit S*k* must be coupled to the load V and to the network L*t* in a manner such that $R_V/Z_0=s_{max}=2.75$ is obtained as the parameter value of the boundary curve $I_3$. According to Equation 6.2.

$$Q_{EV}>Q_{E\ Gen}/\left(\frac{R_V}{Z_0}\right)^2$$

$$Q_{EV}>\frac{380}{(2.75)^2}\approx 50$$

By this choice of $Q_{EV}$, which may be determined by measurement, it is ensured in any case which may occur in operation that the operating point skips the electronically instable region.

If the mean operating point is situated in the high-power region, the locus of substantially all operating points lies in this region and this locus does not extend far into the region of lower power. However, as the diagram shows, this involves a large frequency variation. This is of great advantage in a microwave oven in which the material to be heated is treated in a heating space having dimensions which are large compared with the wavelength. In such a heating space the number of oscillation modes increases with an increase in the operating frequency range. If there are only one or a few oscillation modes, an energy raster is likely to be produced in the material treated, which gives rise to uneven heating. This raster is spatially different for the various oscillation modes. Hence, a continual frequency variation over a wide range produces a large number of oscillation modes so that the location of the energy raster in the material continually changes and the energy distribution becomes more uniform.

This effect may be enhanced by feeding the generator with unsmoothed operating current, which in known manner gives rise to an additional frequency modulation.

The equivalent circuit of FIGURE 6 includes as the network a series resonant circuit R*k* which is connected in series with the load V and forms the dual circuit arrangement of a parallel resonant circuit (S*k*) with a preceding inverting section (L*t*). As FIGURE 6 shows, the series resonant circuit R*k* may be connected either directly to the coupling-out plane 3 of the generator G*en* or at a distance of $n.\lambda_w/2$ in the plane 4. As is known, there is no impedance inversion by a waveguide of length $n.\lambda_w/2$. A waveguide of length $n.\lambda/2$ may also be provided between the loading plane 5 and the load V. A computation analogous to the computation for the combination *Lt—Sk* gives the following condition for skipping the region of electronic instability:

$$Q_{ERk}\cdot\left(\frac{Z_0}{R_V}\right)^2=\frac{1}{\omega_{0\ Rk}C_{Rk}Z_0}\cdot\left(\frac{Z_0}{R_V}\right)^2>Q_{E\ Gen}=\omega_{0\ Gen}C_{Gen}Z_0$$

or, in words, the load resistance V must be so chosen or so coupled to the series resonant circuit R*k* that the external Q factor $Q_{E\ Rk}$ of this circuit multiplied by the square of the reciprocal of the standardized load resistance $(Z_0/R_V)^2$ is greater than the external Q factor $Q_{E\ Gen}$ of the generator.

FIGURE 7 shows an embodiment of the device for generating high frequencies which corresponds to FIGURE 6. The energy of the generator G*en* is coupled through a probe into a waveguide 12 which, at the end remote from a heating space 7, is conductively terminated at a distance of $\lambda_W/4$. A waveguide of length $\lambda_W/2$, which forms the series resonant circuit R*k*, is coupled to the waveguide 12 through a slot 13 in one greater surface of this waveguide at a distance $\lambda_W/2$ from the coupling-out plane 3 of the generator. The coupling factor is determined by the shape and size of the slot.

The heating space 7, loaded by material G, is coupled as a load to the waveguide 12 through a slot 14 of variable shape and size at a distance $\lambda_W/2$ from the plane 4.

The coupling of the series resonance circuit R$k$ through waveguides of length $\lambda_W/2$, which do not invert the impedance, has been chosen to prevent the heating space and the series resonant circuit from exerting disturbing influences on one another through the fields which are not homogeneous at the coupling areas.

What is claimed is:

1. A device for supplying high frequency energy to a load that exhibits a complex admittance in the operating frequency range of the device comprising, a self-excited continuous-wave velocity modulation tube generator adapted to operate at a high power level near its region of electronic instability, a network connected between the velocity modulation tube generator and the load which reacts with said generator to cause the generator frequency to jump the region of electronic instability for given values of load impedance, said network comprising an impedance inverting network and a resonant circuit having a resonance frequency which is about equal to the mean frequency of the velocity modulation tube generator.

2. A device as claimed in claim 1 further comprising, means for coupling, in the order named, the impedance inverting network with the velocity modulation tube generator, the resonant circuit with the impedance inverting network, and the load with the resonant circuit.

3. A device as claimed in claim 2 wherein the resonant circuit comprises a parallel resonant circuit the external Q factor of which multiplied by the square of a standardized load resistance is greater than the external Q factor of the generator in the frequency range of the generator.

4. A device as claimed in claim 1 wherein the electrical parameters of the impedance inverting network are chosen so as to invert the complex admittance of the load and of the resonant circuit coupled therewith to the coupling-out plane of the generator.

5. A device as claimed in claim 1 wherein the impedance inverting network comprises a waveguide having a characteristic impedance which is equal to the impedance by which the generator output is terminated and a length of $(2n-1)\lambda_W/4$, where $n$ is a positive integer and $\lambda_W$ is the wavelength in the waveguide.

6. A device as claimed in claim 1 wherein the network comprises a section of waveguide having a first portion which adjoins the generator coupling-out plane and forms the impedance inverting network, variable coupling means in said waveguide first portion located at a distance $\lambda_W/4$ from the generator for coupling the high frequency energy to the load, the succeeding portion of the waveguide section forming the resonant circuit being short-circuited at the end remote from the generator and tuned to $\lambda_W/4$ resonance, where $\lambda_W$ is the wavelength in the waveguide, and second variable coupling means in said waveguide for coupling the first waveguide portion which forms the impedance inverting network to the succeeding waveguide portion.

7. A device as claimed in claim 1 wherein the impedance inverting network comprises a coaxial line of length $\lambda_W/4$ which is coupled with the load at the end remote from the generator, and wherein said resonant circuit comprises a second coaxial line which is short-circuited at the outer end and tuned to $\lambda_W/4$ resonance and is coupled to the first coaxial line by means of a variable coupling element, where $\lambda_W$ is the wavelength in the coaxial line.

8. A device as claimed in claim 1 wherein the resonant circuit comprises a series resonant circuit which is tuned approximately to the mean frequency of the generator and is coupled to the load, the external Q factor of this circuit multiplied by the square of the reciprocal of a standardized load resistance being greater than the external Q factor of the generator.

9. A high frequency device comprising a continuous wave magnetron adapted to operate at a high power level in the vicinity of its region of electronic instability, a variable load that produces energy reflections within its impedance range, and network means for coupling the magnetron to the load comprising an impedance inverting network and a resonant circuit tuned to a resonant frequency that is approximately equal to the mean frequency of the magnetron.

10. A device as claimed in claim 9 wherein said resonant circuit comprises a parallel resonant circuit, said inverting network and said resonant circuit being connected in series, in that order, between the magnetron and the load, and wherein the parameters of said device are chosen to satisfy the expression $$Q_G < Q_V \left(\frac{R_V}{Z_0}\right)^2$$

where $Q_G$ is the external Q factor of the magnetron, $Q_V$ is the external Q factor of the resonant circuit, $R_V$ is the effective load resistance, and $Z_0$ is the characteristic termination impedance of the magnetron.

11. A device as claimed in claim 10 wherein said inverting network and said resonant circuit comprise first and second sections, respectively, of waveguide coupled together, said first section having a characteristic impedance $Z_0$ that is equal to the characteristic termination impedance $Z_0$ of the magnetron, and said first and second sections being $\lambda_W/4$ in length, where $\lambda_W$ is the wavelength in the waveguide.

12. A device as claimed in claim 9 wherein said inverting network comprises a first section of waveguide coupled to said magnetron and having first and second apertures therein spaced apart a half-wavelength, said resonant circuit comprises a second half-wavelength section of waveguide having an aperture that communicates with the first aperture of said first waveguide section, and a metal chamber for said load having an aperture that communicates with the second aperture of said first waveguide section.

References Cited

UNITED STATES PATENTS

| | | | |
|---|---|---|---|
| 2,485,029 | 10/1949 | Bradley | 331—74 X |
| 2,708,222 | 5/1955 | Herlin | 331—90 X |
| 2,949,581 | 8/1960 | Kline | 331—91 |
| 3,173,103 | 3/1965 | Bean et al. | 331—84 |

ROY LAKE, Primary Examiner

SIEGFRIED H. GRIMM, Assistant Examiner

U.S. Cl. XR.

219—10.55; 315—39, 39.53; 331—77, 81; 333—35, 73

UNITED STATES PATENT OFFICE

CERTIFICATE OF CORRECTION

Patent No. 3,462,704 August 19, 1969

Werner Golombek et al.

It is certified that error appears in the above identified patent and that said Letters Patent are hereby corrected as shown below:

Column 7, line 25, "$w_{sk}$" should read -- $w_{o\ sk}$ --; line 38, "$B_L Z_O$" should read -- $B_L$ --; line 40, before the "[" insert -- $Z_o$ --.

Signed and sealed this 15th day of September 1970.

(SEAL)
Attest:

Edward M. Fletcher, Jr.
Attesting Officer

WILLIAM E. SCHUYLER, JR.
Commissioner of Patents